US008862880B2

(12) United States Patent
Combet et al.

(10) Patent No.: US 8,862,880 B2
(45) Date of Patent: Oct. 14, 2014

(54) TWO-STAGE ANONYMIZATION OF MOBILE NETWORK SUBSCRIBER PERSONAL INFORMATION

(75) Inventors: Jacques Combet, Lavallois Perret (FR); Yves-Marie LeMaitre, Poissy (FR); Antero Kivi, Nuremburg (DE)

(73) Assignee: GfK Holding Inc., New York, NY (US)

( * ) Notice: Subject to any disclaimer, the term of this patent is extended or adjusted under 35 U.S.C. 154(b) by 493 days.

(21) Appl. No.: 13/241,968

(22) Filed: Sep. 23, 2011

(65) Prior Publication Data

US 2013/0080774 A1    Mar. 28, 2013

(51) Int. Cl.
| | |
|---|---|
| H04L 9/32 | (2006.01) |
| H04L 29/06 | (2006.01) |
| H04W 12/02 | (2009.01) |
| H04W 8/26 | (2009.01) |

(52) U.S. Cl.
CPC .............. *H04W 12/02* (2013.01); *H04L 63/30* (2013.01); *H04L 63/0421* (2013.01); *H04W 8/26* (2013.01)
USPC ........... 713/168; 713/154; 713/160; 713/161; 713/171; 726/2; 726/3; 726/4; 726/6; 726/14; 726/26; 726/30; 380/44; 380/277; 380/278

(58) Field of Classification Search
CPC ... H04L 43/12; H04L 47/286; H04L 61/6054; H04L 63/0421; H04W 12/02; H04W 8/26; G06F 21/6254
USPC ........................ 713/154, 168; 726/13; 380/44
See application file for complete search history.

(56) References Cited

U.S. PATENT DOCUMENTS

| | | | |
|---|---|---|---|
| 6,137,911 A | 10/2000 | Zhilyaev | |
| 7,761,088 B1 | 7/2010 | Hannan et al. | |
| 7,877,611 B2 | 1/2011 | Camacho et al. | |
| 8,055,603 B2 | 11/2011 | Angell et al. | |
| 8,201,220 B2 * | 6/2012 | Casey et al. ...................... 726/3 |
| 2002/0016731 A1 | 2/2002 | Kupersmit | |
| 2002/0082923 A1 * | 6/2002 | Merriman et al. ............... 705/14 |
| 2008/0293378 A1 * | 11/2008 | Hinton et al. .................. 455/411 |

(Continued)

FOREIGN PATENT DOCUMENTS

CA    WO2009026170 A2    2/2009

OTHER PUBLICATIONS

Kundu et al, An Architectural Framework for Accurate Characterization of Network Traffic, IEEE, vol. 20, No. 1, Jan. 2009, pp. 111-123.*

(Continued)

*Primary Examiner* — Luu Pham
*Assistant Examiner* — Jenise Jackson
(74) *Attorney, Agent, or Firm* — Dinicola & Young PC; Brian K Dinicola

(57) ABSTRACT

A two-stage anonymization process is applied to monitored network traffic in which unique user identifiers, such as the MSISDN (Mobile Station International Subscriber Directory Number), are extracted from the traffic and anonymized to generate an ASI (anonymized subscriber identifier). A strictly random RSI (random subscriber identifier) is generated and used to replace the ASI. The RSI is generated upon a first occurrence of an ASI and stored in a lookup table for utilization upon subsequent ASI occurrences. Use of the strictly random RSI enables various studies and analysis of user behavior to be performed at a heightened level of privacy protection as compared with conventional anonymization schemes that do not utilize strictly random identifiers.

15 Claims, 7 Drawing Sheets

(56) References Cited

U.S. PATENT DOCUMENTS

| | | | |
|---|---|---|---|
| 2008/0320573 A1* | 12/2008 | Turnbull et al. | 726/6 |
| 2009/0138427 A1 | 5/2009 | Kalavade | |
| 2009/0138446 A1 | 5/2009 | Kalavade | |
| 2009/0138447 A1 | 5/2009 | Kalavade | |
| 2009/0138593 A1 | 5/2009 | Kalavade | |
| 2009/0298480 A1 | 12/2009 | Khambete et al. | |
| 2010/0043072 A1 | 2/2010 | Rothwell | |
| 2010/0190473 A1* | 7/2010 | Ishikawa | 455/411 |
| 2010/0198705 A1* | 8/2010 | Spalink et al. | 705/27 |
| 2011/0010563 A1* | 1/2011 | Lee et al. | 713/189 |
| 2011/0124313 A1* | 5/2011 | Jones | 455/406 |
| 2011/0208862 A1 | 8/2011 | Maffione et al. | |
| 2011/0255688 A1 | 10/2011 | Spalink et al. | |
| 2011/0270971 A1 | 11/2011 | Abraham et al. | |
| 2011/0276394 A1* | 11/2011 | Chan | 705/14.49 |
| 2012/0069752 A1* | 3/2012 | Larocque et al. | 370/252 |
| 2012/0147769 A1 | 6/2012 | Kalavade | |
| 2012/0221570 A1 | 8/2012 | Kalavade | |
| 2012/0317151 A1* | 12/2012 | Ruf et al. | 707/802 |

OTHER PUBLICATIONS

Svoboda et al, Composition of GPRS/UMTS Traffic: Snapshots from a Live Network, IEEE, 2006, pp. 1-12.*

Indra Devi et al: "Generating best features for web page classification", Webology, vol. 5, No. 1, Mar. 2008.

Aijun An et al: Transactions on Rough Sets II; Rough sets and fuzzy sets; [Lecture Notes in Computer Science / Transactions on Rough Sets], 20050112 Springer-Verlag, Berlin, Heidelberg CPC, pp. 1-15.

Xiong, Huijun et al "User Assisted Host-Based Detection of Outbound Malware Traffic" Information and Communications Security. Springer Berlin Heidelberg, 2009, pp. 2930307.

Akriditis et al, "Proximity Breeds Danger: Emerging Threats in Metro-area Wireless Networks" (2007).

"Setting HTTP Status Codes" (http://www.apl.jhu.edu/~hall/java/Servlet-Tutorial-Response-Status-Line.html).

Madory, Douglas: "New Methods of Spoof Detection in 802.11b Wireless Networking" (Jun. 2006).

Stassapolou et al, "Web Root Detection: A Probabilistic Reasoning Approach" (Feb. 27, 2009) Computer Networks, Elsevier Science Publishers, B.V., Amsterdam, Netherlands, vol. 53, No. 3, pp. 265-278.

Lee and Gupta, "A New Traffic Model for Current User Web Browsing Behavior", Intel Corp. (2007).

Weinreich, Harald et al, Data Cleaning Methods for Client and Proxy Logs (2006).

Feng, Qiu et al. "Analysis of User Web Traffic with a Focus on Search Activities." (2005), "Analysis of User Web Traffic with a Focus on Search Activities", Proc of the International Workshop on the Web and Databases (WebDB) 2005.

Weinreich, Harald et al "Off the Beaten Tracks: Exploring Three Aspects of Web Navigation" Proc. of the 15th International Conference on World Wide Web. ACM 2006.

Erman, Jeffrey et al, "HTTP in the Home: It is not just about PCs" ACM SIGCOMM Computer Communication Review 41.1 (Jan. 2011); 90-95.

* cited by examiner

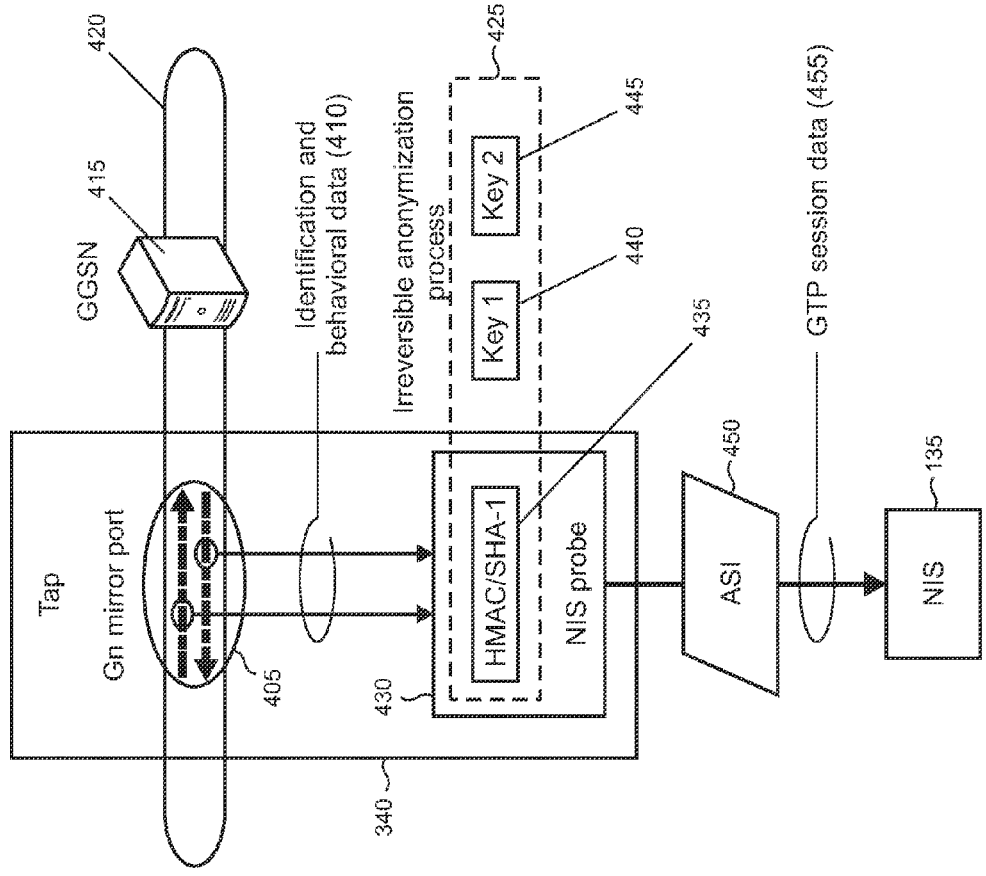

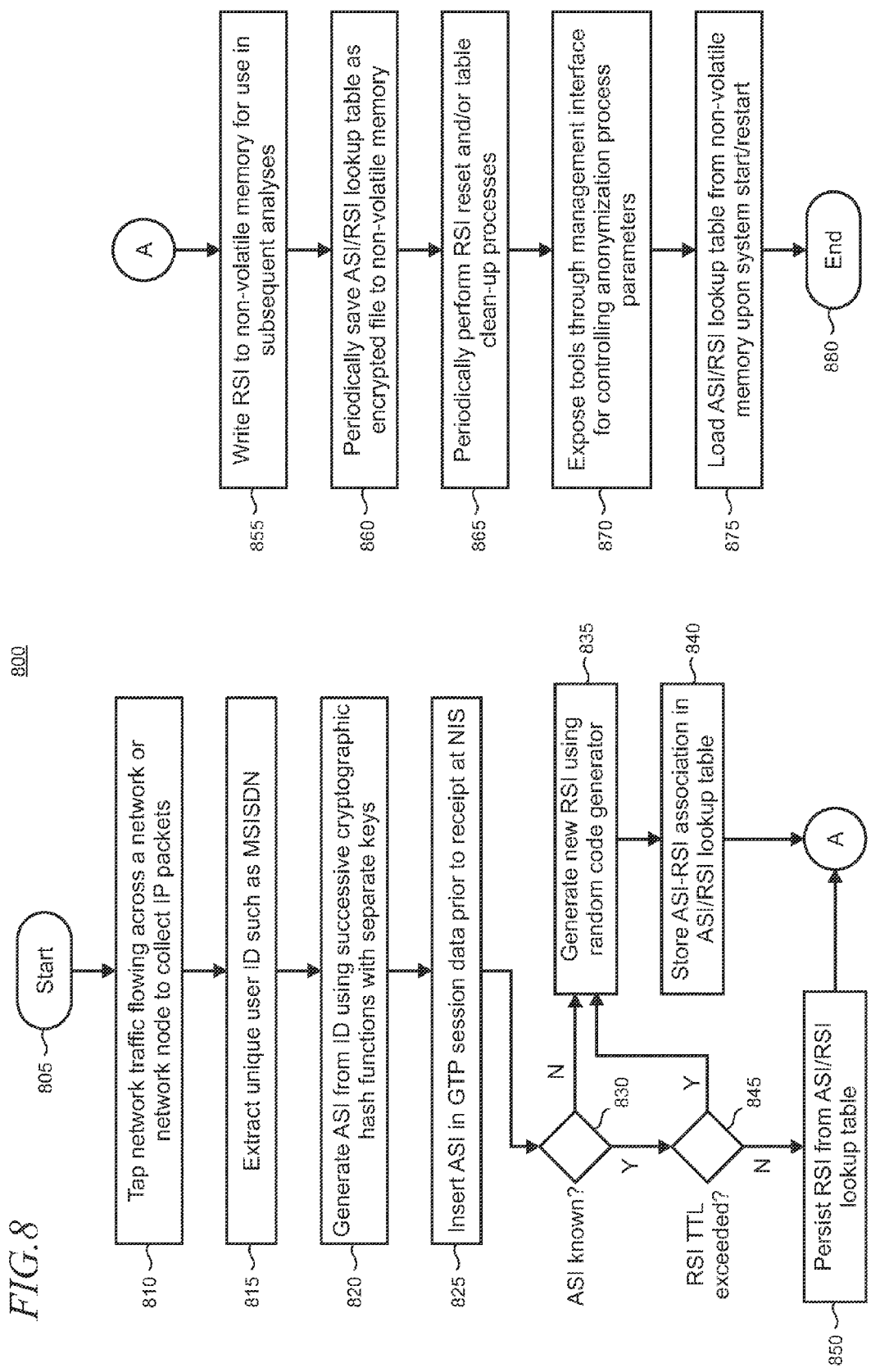

US 8,862,880 B2

TWO-STAGE ANONYMIZATION OF MOBILE NETWORK SUBSCRIBER PERSONAL INFORMATION

BACKGROUND

Communication networks provide services and features to users that are increasingly important and relied upon to meet the demand for connectivity to the world at large. Communication networks, whether voice or data, are designed in view of a multitude of variables that must be carefully weighed and balanced in order to provide reliable and cost effective offerings that are often essential to maintain customer satisfaction. The ability to analyze network activities and manage information gained from the accurate measurement of network traffic characteristics is generally important to ensure successful network operations. However, for reasons of security and privacy, monitored network traffic typically needs to be irreversibly anonymized so that Personally Identifiable Information (PII) about users is not directly or indirectly revealed. While current anonymization methodologies often perform satisfactorily, there are some instances where stronger privacy protection is needed.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A two-stage anonymization process is applied to monitored network traffic in which unique user identifiers, such as the MSISDN (Mobile Station International Subscriber Directory Number), are extracted from the traffic and anonymized to generate an ASI (anonymized subscriber identifier). A strictly random RSI (random subscriber identifier) is generated and used to replace the ASI. The RSI is generated upon a first occurrence of an ASI and stored in a lookup table for utilization upon subsequent ASI occurrences. Use of the strictly random RSI enables various studies and analyses of user behavior to be performed at a heightened level of privacy protection as compared with conventional anonymization schemes that do not utilize strictly random identifiers.

In various illustrative examples, the ASI is generated by a network probe associated with a network intelligence solution (NIS) arranged for monitoring a mobile communications network such as a GPRS (General Packet Radio Service) network. The ASI is generated by applying a cryptographic hash function such as HMAC-SHA1 (Hash-based Message Authentication Code-Secure Hash Algorithm 1) to the MSISDN twice in succession using two separate keys. The ASI is inserted into GTP (GPRS Tunneling Protocol) traffic and received at the NIS which generates an RSI using a collision-free random code generator. The associated ASI and RSI are stored in an ASI/RSI lookup table so that the RSI can be persisted for subsequent occurrences of the ASI that are received at the NIS. Advantageously, such persistence enables behavioral metrics such as unique user visits to be collected while preserving heightened privacy protections.

The ASI/RSI lookup table can be cleaned-up by an automated process that loops through the table on a periodic basis to remove inactive ASIs. The RSI may be periodically reset to limit individual RSI persistence by subjecting the RSI to a time-to-live (TTL) value where the association between a given ASI and RSI is deleted when the TTL value is exceeded using an automated process that loops through the lookup table. In this case, a new RSI is generated even when the ASI has been previously seen at the NIS. A management interface can be locally instantiated at the NIS or implemented remotely to provide an administrator with tools to manage various aspects of the two-stage anonymization process. For example, parameters used by the table clean-up and RSI reset procedures can be specified at the management interface, the ASI/RSI table may be periodically saved to persistent storage, and process logging and monitoring functions may be controlled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows illustrative generation of an anonymized subscriber identifier (ASI) that is inserted into GTP (GPRS Tunneling Protocol where GPRS is an acronym for General Packet Radio Service) session data prior to the data being received at the NIS;

FIG. 5 shows various illustrative types of IDs (identifiers) that expose Personally Identifiable Information (PII) that may be extracted from GTP traffic and utilized as inputs to the ASI generation;

FIG. 8 is a flowchart of an illustrative method for two-stage anonymization of mobile network subscriber personal information;

Like reference numerals indicate like elements in the drawings. Unless otherwise indicated, elements are not drawn to scale.

DETAILED DESCRIPTION

Figure 1:
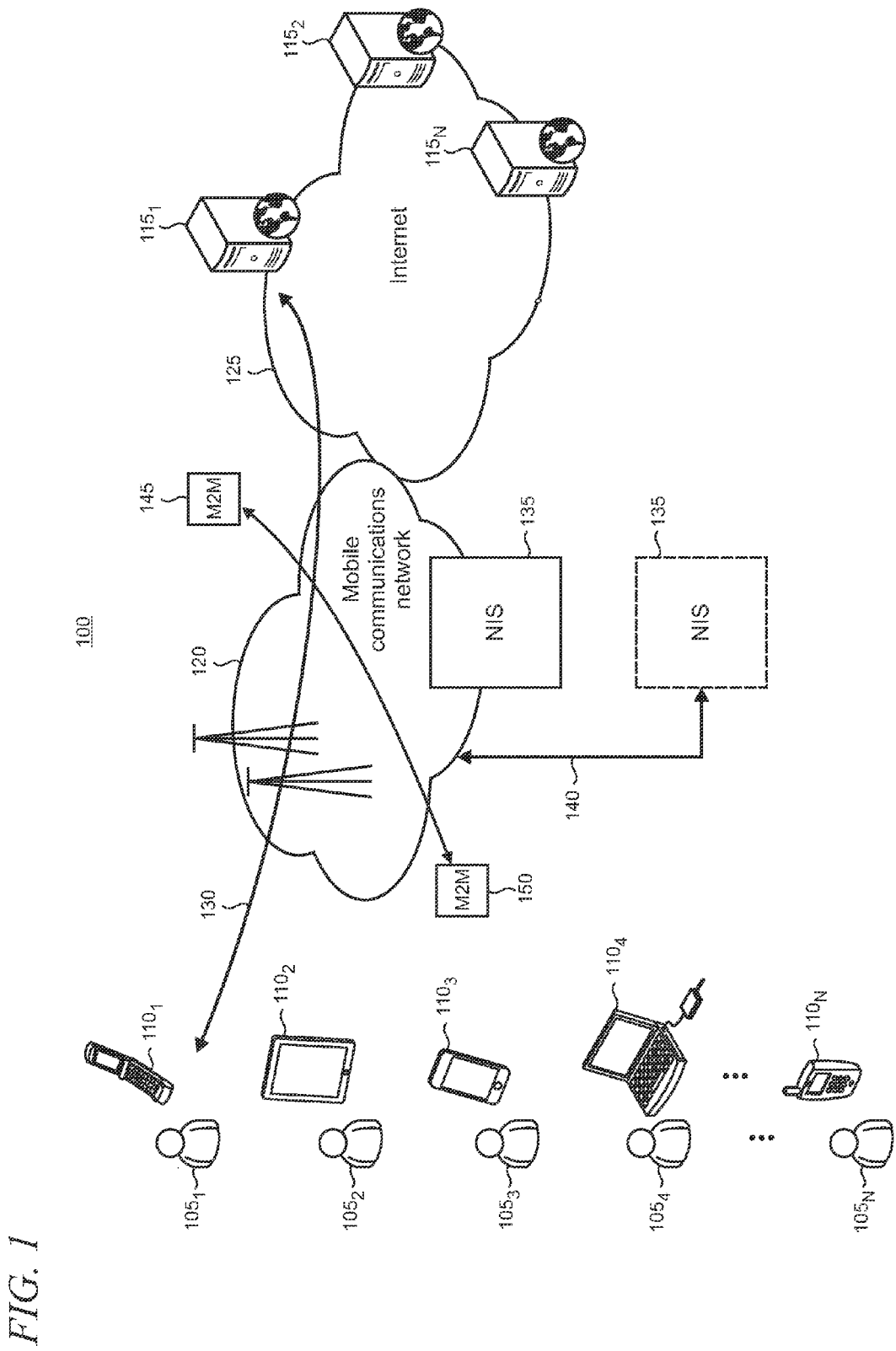
FIG. 1 shows an illustrative mobile communications network environment that facilitates access to resources by users of mobile equipment and with which the present system and method may be implemented.

FIG. 1 shows an illustrative mobile communications network environment 100 that facilitates access to resources by users $105_{1, 2 \ldots N}$ of mobile equipment $110_{1, 2 \ldots N}$ and with which the present arrangement may be implemented. In this example, the resources are web-based resources that are provided from various websites $115_{1, 2 \ldots N}$. Access is implemented, in this illustrative example, via a mobile communications network 120 that is operatively connected to the websites 115 and/or other resources via the Internet 125. Accordingly, the users 105 are typically subscribers to a service that operates in whole or part over the mobile communications network 120. It is emphasized that the present arrangement is not necessarily limited in applicability to mobile communications network implementations and that other network types that facilitate access to the World Wide Web including local area and wide area networks, PSTNs (Public Switched Telephone Networks), and the like that may incorporate both wired and wireless infrastructure may be utilized in some implementations.

In this illustrative example, the mobile communications network 120 may be arranged using one of a variety of alternative networking standards such as GPRS (General Packet Radio Service), UMTS (Universal Mobile Telecommunications System), GSM/EDGE (Global System for Mobile Communications/Enhanced Data rates for GSM Evolution), CDMA (Code Division Multiple Access), CDMA2000, or other 2.5G, 3G, 3G+, or 4G ($2.5^{th}$ generation, $3^{rd}$ generation, $3^{rd}$ generation plus, and $4^{th}$ generation, respectively) wireless standards, and the like.

The mobile equipment 110 may include any of a variety of conventional electronic devices or information appliances that are typically portable and battery-operated and which may facilitate communications using voice and data. For example, the mobile equipment 110 can include mobile phones (e.g., non-smart phones having a minimum of 2.5G capability), e-mail appliances, smart phones, PDAs (personal digital assistants), ultra-mobile PCs (personal computers), tablet devices, tablet PCs, handheld game devices, digital media players, digital cameras including still and video cameras, GPS (global positioning system) navigation devices, pagers, electronic devices that are tethered or otherwise coupled to a network access device (e.g., wireless data card, dongle, modem, or other device having similar functionality to provide wireless Internet access to the electronic device) or devices which combine one or more of the features of such devices. Typically, the mobile equipment 110 will include various capabilities such as the provisioning of a user interface that enables a user 105 to access the Internet 125 and browse and selectively interact with web pages that are served by the Web servers 115, as representatively indicated by reference numeral 130.

The network environment 100 may also support communications among machine-to-machine (M2M) equipment and facilitate the utilization of various M2M applications. In this case, various instances of peer M2M equipment (representatively indicated by reference numerals 145 and 150) or other infrastructure supporting one or more M2M applications will send and receive traffic over the mobile communications network 120 and/or the Internet 125. In addition to accessing traffic on the mobile communications network 120 in order to classify web pages and domains in an automated manner, the present arrangement may also be adapted to access M2M traffic traversing the mobile communications network. Accordingly, while the methodology that follows is applicable to an illustrative example in which Internet usage of mobile equipment users is measured, those skilled in the art will appreciate that a similar methodology may be used when M2M equipment is utilized.

A network intelligence solution (NIS) 135 is also provided in the environment 100 and operatively coupled to the mobile communications network 120, or to a network node thereof (not shown) in order to access traffic that flows through the network or node. In alternative implementations, the NIS 135 can be remotely located from the mobile communications network 120 and be operatively coupled to the network, or network node, using a communications link 140 over which a remote access protocol is implemented. In some instances of remote operation, a buffer (not shown) may be disposed in the mobile communications network 120 for locally buffering data that is accessed from the remotely located NIS.

It is noted that performing network traffic analysis from a network-centric viewpoint can be particularly advantageous in many scenarios. For example, attempting to collect information at the mobile equipment 110 can be problematic because such devices are often configured to utilize thin client applications and typically feature streamlined capabilities such as reduced processing power, memory, and storage compared to other devices that are commonly used for web browsing such as PCs. In addition, collecting data at the network advantageously enables data to be aggregated across a number of instances of mobile equipment 110, and further reduces intrusiveness and the potential for violation of personal privacy that could result from the installation of monitoring software at the client. The NIS 135 is described in more detail in the text accompanying FIGS. 3 and 6 below.

Figure 2:
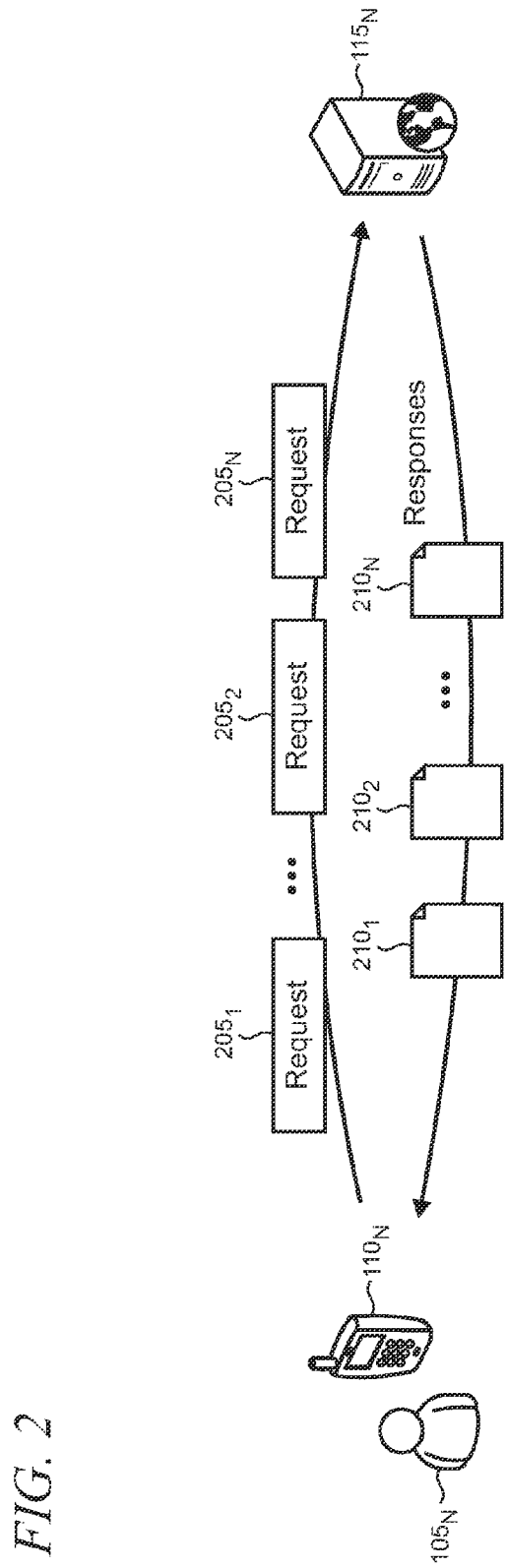
FIG. 2 shows an illustrative web browsing session which utilizes a request-response communication protocol.

FIG. 2 shows an illustrative web browsing session which utilizes a protocol such as HTTP (HyperText Transfer Protocol) or SIP (Session Initiation Protocol). In this particular illustrative example, the web browsing session utilizes HTTP which is commonly referred to as a request-response protocol that is commonly utilized to access websites. Access typically consists of file requests $205_{1, 2 \ldots N}$ for pages or objects from a browser application executing on the mobile equipment 110 to a website 115 and corresponding responses $210_{1, 2 \ldots N}$ from the website server. Thus, at a high level, the user 105 interacts with a browser to request, for example, a URL (Uniform Resource Locator) to identify a site of interest, then the browser requests the page from the website 115. When receiving the page, the browser parses it to find all of the component objects such as images, sounds, scripts, etc., and then makes requests to download these objects from the website 115.

Figure 3:
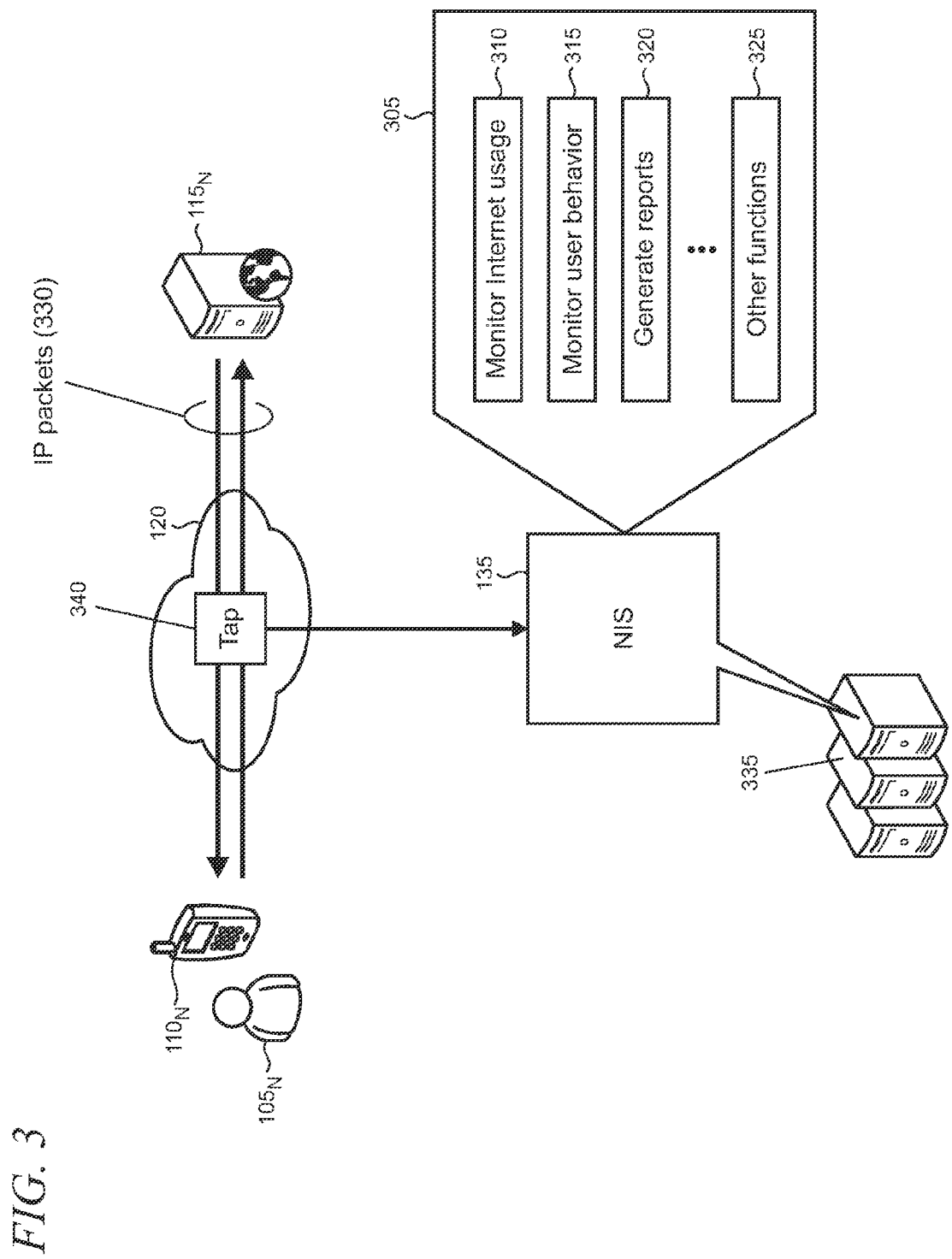
FIG. 3 shows an illustrative NIS that may be located in a mobile communications network or node thereof and which taps information from traffic flowing in the network.

FIG. 3 shows details of the NIS 135 which is arranged, in this illustrative example, to monitor network traffic in the mobile communications network 120 in order to perform a variety of analyses 305. Such analyses 305, as respectively indicated by reference numerals 310, 315, 320, and 325 in FIG. 3, illustratively include monitoring Internet usage by the users 105, monitoring user behaviors, generating various reports, and performing other analytical or monitoring functions as may be required. In some implementations, the NIS 135 will perform deep packet inspection of the monitored traffic in order to facilitate such analyses. It is emphasized that the exemplary analyses shown in FIG. 3 are intended to be illustrative and that the number and particular analyses that are utilized in any given application can differ from what are shown.

The NIS 135 is typically configured as one or more software applications or code sets that are operative on a computing platform such as a server 335 or distributed computing system. In alternative implementations, the NIS 135 can be arranged using hardware and/or firmware, or various combinations of hardware, firmware, or software as may be needed to meet the requirements of a particular usage scenario. As shown, network traffic typically in the form of IP (Internet Protocol) packets 330 flowing through the mobile communications network 120, or a node of the network, is captured via a tap 340.

FIG. 4 shows details of operations that may be performed at the tap 340. At a mirror port 405 conforming to the Gn (i.e., Ethernet) interface in the GPRS protocol, identification and behavioral data 410 are extracted from GTP (GPRS Tunneling Protocol) traffic at a Gateway GPRS Support Node (GGSN) 415 along some portion 420 of the mobile communications network. As shown in FIG. 5, the data 410 typically includes some form of indirect Personally Identifiable Information (PII) 505 such as the MSISDN (Mobile Station International Subscriber Directory Number) 510 associated with mobile equipment 110 employed by a network user 105 (FIG.

1), or alternatively, the IMEI (International Mobile Equipment Identity) 515, or IMSI (International Mobile Subscriber Identity) 520.

Returning to FIG. 4, an irreversible anonymization process 425 is implemented at an NIS probe 430 in the first anonymization stage of the present arrangement. The process 425 applies a cryptographic hash function 435, such as the known HMAC-SHA1 hash (Hash-based Message Authentication Code-Secure Hash Algorithm 1) successively to the MSISDN, in this example, using two separate keys 440 and 445, to generate anonymized code referred to here as the anonymized subscriber identifier (ASI) 450. The ASI 450 is inserted into the GTP session data 455 at the NIS probe 430 before the data is received at the NIS 135, as shown in FIG. 5.

Figure 6:
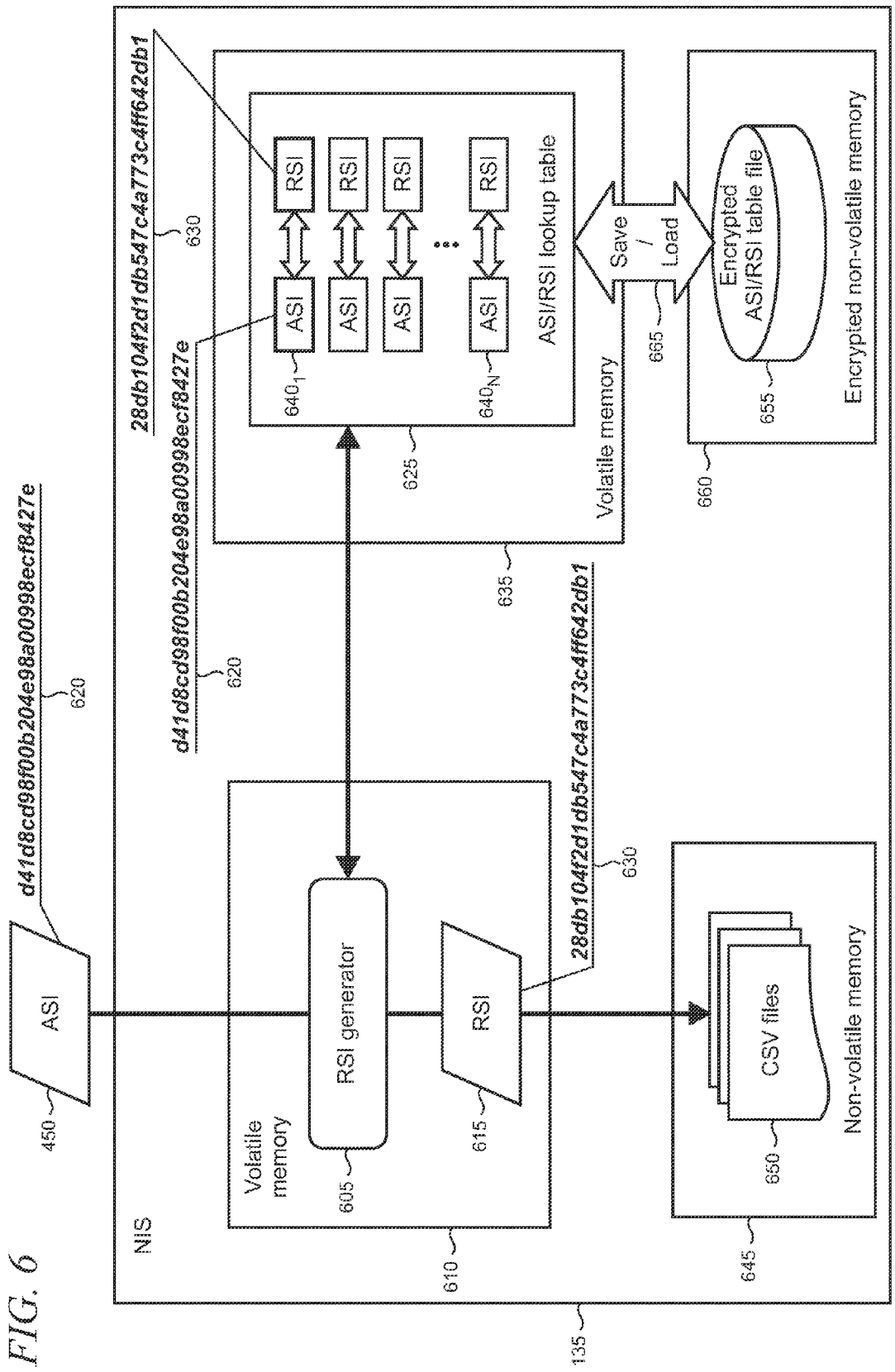
FIG. 6 shows illustrative generation of a random subscriber identifier (RSI) at the NIS.

FIG. 6 shows the second stage of the present arrangement in which a random subscriber identifier (RSI) is generated at the NIS 135. Using an RSI generator 605 in the NIS 135 which may be embodied, for example, as a collision free random code generator executing in volatile memory 610, an RSI 615 is implemented as random code which replaces the ASI 450 received at the NIS 135. In this particular example, the ASI 450 is represented in exemplary hexadecimal form, as shown in FIG. 6 by reference numeral 620. When the ASI 450 received at the RSI generator 605 has not been previously seen (i.e., is unknown), then a new RSI is generated and the associated ASI/RSI pair is written to a lookup table 625. The associated RSI is represented in exemplary hexadecimal form by reference numeral 630.

The lookup table 625 will typically be implemented in volatile memory 635 and will store different ASI/RSI pairs $640_{1, 2 \ldots N}$ where the size of the table can vary by implementation. In addition to containing the values of ASI/RSI pairs, in some implementations, the lookup table 625 can store additional fields of information such as record creation time and last record read time on a per-ASI/RSI pair basis.

When an ASI is received at the RSI generator 605 that has been seen before and is thus known (i.e., is already present in the ASI/RSI lookup table 625), then the RSI associated with that particular ASI is reused. Among other applications, such reuse enables RSI persistence so that reports including metrics such as unique visits, for example, can be generated. The RSI 615, whether newly generated by the generator 605 or persisted from the lookup table 625, can be archived in non-volatile memory 645 such as a hard-disk drive or other stable storage in the form of comma-separated value (CSV) files 650, for example.

In some applications, excessive individual RSI persistence may be avoided by limiting the time for which an ASI-RSI association remains valid. Here, an RSI may be assigned a time-to-live (TTL) value that when exceeded will cause the RSI to be deleted from the lookup table 625. In this case, when an ASI is received at the RSI generator 605, even if previously seen and known, a new RSI will be generated. An automated RSI-reset process can typically be used to periodically loop through the lookup table 625 and delete the ASI-RSI associations for which the RSI has exceeded its TTL value. For example, old records are selected for deletion using an age calculation in which the "record creation time" field from the ASI/RSI lookup table is compared to the current time. When the calculated age exceeds the defined TTL the relevant records are removed from the table.

The TTL value may be configured to be specifiable in some cases by an administrator or other qualified personnel having access to the NIS 135. In a similar manner, an automated table clean-up process may be run periodically to remove inactive ASI entries from the lookup table 625. For example, inactive records are selected for deletion using an age calculation in which the "last record time" field from the ASI/RSI lookup table is compared to the current time. When the calculated age exceeds some arbitrary (or administrator-specified) threshold, the records are removed from the table.

An ASI/RSI lookup table "save" functionality may be optionally enabled in order to prevent the loss of ASI-RSI association when the NIS 135, or particular processes/applications running on it, are started or restarted. In this case, the ASI/RSI lookup table 625 is periodically written to an encrypted file 655 in encrypted non-volatile memory 660 (such as a hard-disk drive or other stable storage) and then loaded into volatile memory upon startup/restart, as indicated by the arrow 665 in FIG. 6. A conventional encryption algorithm such as AES-128 (Advanced Encryption Standard using a 128 bit cryptographic key) may be used to perform the encrypted write.

Figure 7:
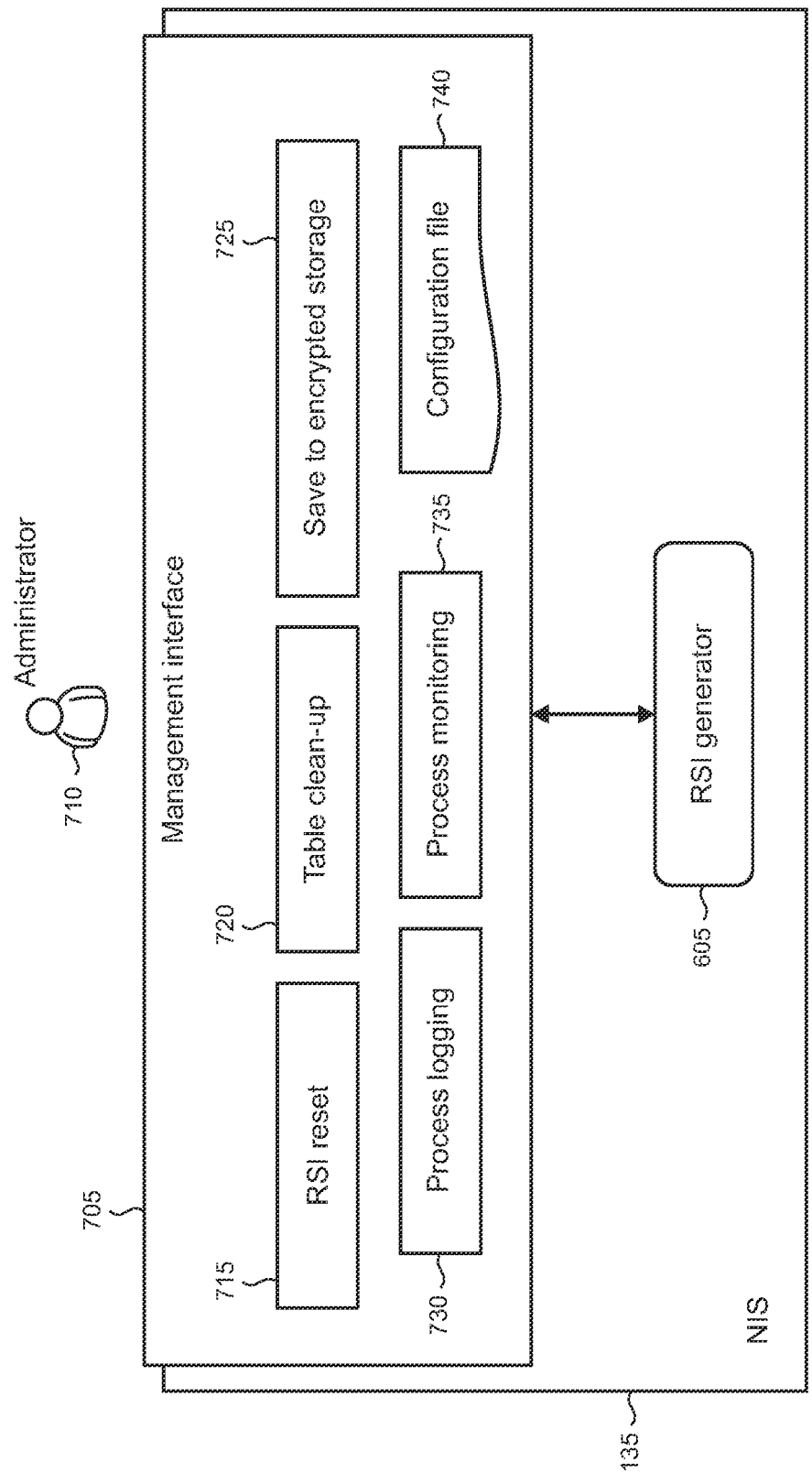
FIG. 7 shows an illustrative management interface to an RSI generator.

FIG. 7 shows an illustrative management interface 705 exposed by the NIS 135 to an administrator 710, or other qualified personnel, to the RSI generator 605. The management interface 705 provides a set of tools to enable the administrator 710 to perform a variety of management functions pertaining to the present two-stage anonymization process. An RSI reset function 715 can be configured to enable the administrator 710 to specify the value of the TTL in some convenient time unit (e.g., seconds). The RSI reset function 715 may also allow the administrator to specify the periodicity of the looping of the RSI reset process through the ASI/RSI lookup table 625 (FIG. 6). A table clean-up function 720 can be configured to enable the administrator 710 to specify the threshold age at which inactive ASI entries are removed from the table. The table clean-up function 720 may also allow the administrator to specify the periodicity of the looping of the table clean-up process through the ASI/RSI lookup table.

A save to encrypted storage function 725 may enable the administrator 710 to set an option to allow the ASI/RSI lookup table 625 to be saved as an encrypted file 655 to non-volatile memory 660 (FIG. 6). The administrator may also specify the periodicity of the save to non-volatile memory using the save function 725 in some cases. Process logging and monitoring functions, respectively indicated by reference numerals 730 and 735, can also be provided by the management interface 705 to enable the administrator 710 to specify parameters pertaining to logging and monitoring of the present two-stage anonymization process. A configuration file 740 may be utilized to store various parameters associated with the two-stage anonymization process and/or the tools included in the management interface 705.

FIG. 8 shows a flowchart of an illustrative method 800 for two-stage anonymization of mobile network subscriber personal information. The method 800 may be implemented, for example, using the elements shown in FIGS. 4, 6, and 7 and described in the accompanying text. The method begins at block 805. At block 810, GTP traffic flowing across a network or network node is tapped to collect IP packets. At block 815, a unique user ID, such as the MSISDN is extracted from the GTP traffic at the NIS probe 430. An ASI is generated by application of two successive cryptographic hash functions, such as HMAC-SHA1, to the extracted ID at block 820. The ASI is inserted at the NIS probe 430 into the GTP session data prior to being sent to the NIS 135 for subsequent processing at block 825.

At decision block 830, if the ASI received at the RSI generator 605 in the NIS 135 has not been seen previously (i.e., is unknown), then a new RSI is generated at block 835 and the ASI-RSI association is stored in the ASI/RSI lookup table 625 at block 840. If the received ASI is known, then control passes to decision block 845 where it is determined if the RSI associated with the received ASI has exceeded its TTL. If it has, then a new RSI is generated at block 835. If the TTL has not been exceeded, then at block 850, the RSI that is associated with the received ASI is persisted from the ASI/RSI lookup table 625.

At block 855, the RSI is written to non-volatile memory 645, for example in one or more CSV files 650, for use in subsequent analyses. Such analyses may include those shown in FIG. 3 and described in the accompanying text. At block 860, the ASI/RSI lookup table can be periodically saved as an encrypted file 655 in non-volatile memory 660. At block 865, the automated RSI reset and/or table clean-up processes are performed periodically. At block 870, one or more tools can be exposed through the management interface 705 to enable an administrator, or other qualified personnel to control various parameters used in the present two-stage anonymization process. At block 875, the ASI/RSI lookup table can be loaded from non-volatile memory upon startup or restart of a computing platform upon which the two-stage anonymization process executes.

It is noted that the method steps shown at blocks 855 to 875 can be performed in a different order from what is shown in FIG. 8. The method ends at block 880.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device for processing the anonymizing identifier associated with a user of a network comprising:
    a network probe;
    a memory; and
    a computer processor in communication with the memory, the processor executes a program stored on said memory to perform the steps of:
    tapping traffic traversing a portion of the network to collect session data;
    extracting the identifier wherein the identifier is one of mobile station international subscriber directory number (MSISDN), international mobile equipment identity (IMEI), or international mobile subscriber identity (IMSI) from the tapped traffic;
    applying by the network probe a cryptographic hash function Hash-based Message Authentication Code-Secure Hash Algorithm 1 (HMAC-SHA1) at least once to the extracted identifier to generate an anonymized subscriber identifier (ASI);
    applying twice in succession the HMAC-SHA1 to the MSISDN, IMEI, or IMSI respectively using two separate keys
    inserting the ASI into the session data; and
    sending the session data with inserted ASI to a network intelligence solution (NIS);
    generating random subscriber identifier (RSI) using random generator;
    enabling the NIS to associate the ASI to a strictly random subscriber identifier (RSI); and
    storing the associated ASI and RSI in a lookup table.

2. The computer-implemented method of claim 1 in which the network is a general packet radio service (GPRS) mobile network and the session data is general packet radio service tunneling protocol (GTP) session data.

3. One or more non-transitory computer-readable storage media storing instructions which, when executed by one or more processors disposed in an electronic device, perform a method for generating a strictly random identifier for a user of a communications network, the method comprising the steps of:
    receiving, at a network intelligence solution (NIS), an anonymized subscriber identifier (ASI) generated at a network probe by applying twice of one or more cryptographic hash functions HMAC-SHA1 to a unique identifier associated with the user, the unique identifier being extracted from traffic traversing the network, and the ASI received as part of session data sent from the network probe to the NIS;
    generating a strictly random subscriber identifier (RSI) responsively to the received ASI in the session data;
    storing an association between the received ASI and generated RSI in a lookup table; and
    retrieving the RSI from the lookup table upon a subsequent receipt of the ASI at the NIS
    assigning a time-to-live (TTL) to the RSI and deleting the association between the ASI and RSI in the lookup table when the TTL value is exceeded;
    assigning an aging threshold to the ASI and deleting the ASI from the lookup table when the threshold is exceeded.

4. The one or more non-transitory computer-readable storage media of claim 3 in which the communications network is a mobile communications network and the unique identifier is associated with mobile equipment utilized by the user to access the mobile communications network, the mobile equipment comprising one of mobile phone, e-mail appliance, smart phone, non-smart phone, machine to machine (M2M) equipment, personal digital assistants (PDA), personal computers (PC), ultra-mobile PC, tablet device, tablet PC, handheld game device, digital media player, digital camera, global positioning system (GPS) navigation device, pager, wireless data card, wireless dongle, wireless modem, or device which combines one or more features thereof.

5. The one or more non-transitory computer-readable storage media of claim 3 in which the NIS performs deep packet inspection of traffic flowing between mobile equipment utilized by the user and Internet-based servers.

6. The one or more non-transitory computer-readable storage media of claim 3 in which the method further includes a step of exposing a management interface to enable the TTL value to be specified by an administrator.

7. The one or more non-transitory computer-readable storage media of claim 6 in which the method further includes a step of exposing a management interface to enable a value of the threshold to be specified by an administrator.

8. A computer-implemented method for anonymizing indirect personally identifiable information (PII) associated with a subscriber to a mobile communications network using a two-stage anonymization process, the method comprising the steps of:
    inserting a probe at a node of the mobile communications network to tap general packet radio service tunneling protocol (GTP) traffic;
    extracting a unique identifier from the traffic that exposes the subscriber PII;
    applying twice in a first stage of the two-stage anonymization process, a cryptographic hash HMAC-SHA1 at least once at the probe to the extracted unique identifier to generate an anonymized subscriber identifier (ASI);

sending the generated ASI in GTP session data to a network intelligence solution (NIS) that is operatively coupled to the probe;

repeating the steps of extracting, applying, and sending, until a succession of ASIs is sent from the probe to the NIS;

generating in a second stage of the two-stage anonymization process, a random subscriber identifier (RSI) at the NIS responsively to an initial occurrence of an ASI where the RSI is strictly random;

storing the ASI and RSI as an associated pair in a lookup table;

assigning a time-to-live (TTL) to the RSI; upon receipt of a subsequent occurrence of the ASI, persisting the RSI from the lookup table if the TTL is not expired, otherwise generating a new RSI; and writing the RSI to a file to support analyses of subscriber behavior or Internet usage using the GTP session data.

9. The computer-implemented method of claim 8 in which the node is a gateway GPRS support node.

10. The computer-implemented method of claim 8 in which the RSI generating is performed using a collision-free random code generator.

11. The computer-implemented method of claim 8 further including a step of periodically storing the lookup table as an encrypted file in non-volatile memory.

12. The computer-implemented method of claim 8 further including a step of loading the lookup table from non-volatile memory upon startup or restart of a system on which the computer-implemented method executes.

13. The computer-implemented method of claim 8 further including a step of exposing tools through a management interface for controlling parameters used by the two-stage anonymization process.

14. The computer-implemented method of claim 13 in which the tools facilitate control of at least one of resetting the RSI including specification of a value for the TTL, cleaning up the lookup table, saving the lookup table to encrypted storage, process monitoring, or process logging.

15. The computer-implemented method of claim 13 in which the management interface is instantiated locally with the NIS or remotely located from the NIS.

* * * * *